US012379084B2

(12) United States Patent
Lee

(10) Patent No.: US 12,379,084 B2
(45) Date of Patent: Aug. 5, 2025

(54) LAMP FOR VEHICLE

(71) Applicant: HYUNDAI MOBIS CO., LTD., Seoul (KR)

(72) Inventor: Hyun Soo Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/339,711

(22) Filed: Jun. 22, 2023

(65) Prior Publication Data

US 2024/0060614 A1 Feb. 22, 2024

(30) Foreign Application Priority Data

Aug. 18, 2022 (KR) ........................ 10-2022-0103091

(51) Int. Cl.
*F21S 41/265* (2018.01)
*F21S 41/143* (2018.01)
*F21S 41/43* (2018.01)

(52) U.S. Cl.
CPC ........... *F21S 41/265* (2018.01); *F21S 41/143* (2018.01); *F21S 41/43* (2018.01)

(58) Field of Classification Search
CPC ........ F21S 41/265; F21S 41/143; F21S 41/43; F21S 41/275; F21S 41/255; F21S 41/26; F21S 41/141
See application file for complete search history.

(56) References Cited

U.S. PATENT DOCUMENTS 10,082,264 B2 * 9/2018 Hossfeld ................. F21S 43/40
10,107,473 B2 * 10/2018 Khrushchev ......... G02B 3/0062
10,288,255 B2 * 5/2019 Tsai ........................ F21V 5/007
10,724,700 B2 * 7/2020 De Lamberterie ..... F21S 41/27
10,876,698 B2 * 12/2020 Mayer ...................... F21S 41/25
2021/0341123 A1 * 11/2021 Mototsuji ............. F21S 41/143
2021/0388961 A1 * 12/2021 Lee ....................... F21S 41/285

FOREIGN PATENT DOCUMENTS

KR 20160136900 A * 11/2016

OTHER PUBLICATIONS

Toyotec, “What is an Aspherical Lens”, Optical Design Technology Navigator, pulled from wayback machine, Apr. 15, 2021, https://optical-tech-group.toyotec.com/en/technicalcolumn/what-is-an-aspherical-lens-about-its-features-and-benefits/ (Year: 2021).*

“aspheric Lens”, Wikipedia, Oct. 6, 2014, https://en.wikipedia.org/wiki/Aspheric_lens#:~: text=An%20aspheric%20lens%20or%20asphere,often%20called%20an%20aspherical%20lens. (Year: 2014).*

* cited by examiner

*Primary Examiner* — Matthew J. Peerce
(74) *Attorney, Agent, or Firm* — NovoTechIP International PLLC

(57) ABSTRACT

Disclosed is a lamp for a vehicle including a light source unit, a first lens unit disposed on a front side of the light source unit, and that condenses a light output from the light source unit and output the light to a front side, and a second lens unit provided on a front side of the first lens unit, and that diffuses and outputs the light input from the first lens unit, and the second lens unit includes a plurality of optics provided on any one of a surface, to which the light is input, and a surface, from which the light is output, formed to extend in a first direction that is perpendicular to a ground surface, and arranged along a second direction that is perpendicular to the first direction.

9 Claims, 10 Drawing Sheets

LAMP FOR VEHICLE

CROSS-REFERENCE TO RELATED APPLICATIONS

This application claims the benefit of priority to Korean Patent Application No. 10-2022-0103091, filed in the Korean Intellectual Property Office on Aug. 18, 2022, the entire contents of which are incorporated herein by reference.

TECHNICAL FIELD

The present disclosure relates to a lamp for a vehicle.

BACKGROUND

A micro lens array (MLA) projects an image with an arrangement of a plurality of micro lenses. Because the micro lens array may display an image of an excellent quality with a small size, it is widely used in various fields. In recent years, studies for reducing a size of a lamp for a vehicle by using micro lenses having a relatively small focal distance have been actively made.

In a conventional micro lens array, a plurality of input part lenses are formed on an input surface of a lens body and a plurality of output part lenses are formed on an output surface of the lens body. Furthermore, a shield is coated in an interior of the lens body.

However, the conventional micro lens array requires a process of forming a plurality of lenses arranged in a longitudinal direction and a transverse direction of the lens body on an input surface and an output surface and finely arranging the plurality of input part lenses and the corresponding output part lenses at corresponding locations. Furthermore, a process of coating the shield in the interior of the lens body is necessary. Accordingly, the conventional micro lens array requires a complex structure and much manufacturing time, and thus a work performance thereof is degraded.

SUMMARY

The present disclosure has been made to solve the above-mentioned problems occurring in the prior art while advantages achieved by the prior art are maintained intact.

An aspect of the present disclosure provides a lamp for a vehicle that may enhance work performance and reduce costs by simplifying a structure and a manufacturing process thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a lamp for a vehicle includes a light source unit, a first lens unit disposed on a front side of the light source unit, and that condenses a light output from the light source unit and output the light to a front side, and a second lens unit provided on a front side of the first lens unit, and that diffuses and output the light input from the first lens unit, and the second lens unit includes a plurality of optics provided on any one of a surface, to which the light is input, and a surface, from which the light is output, formed to extend in a first direction that is perpendicular to a ground surface, and arranged along a second direction that is perpendicular to the first direction.

The first lens unit may include an input part including a first input surface that is a surface, to which the light is input from the light source unit, and an output part including a first output surface that is a surface, from which the light input to the input part is output, and the output part may be an aspheric lens, in which the first output surface is aspheric.

A focus of the output part may be formed on the first input surface.

A shape of the input part may have a four-sided plate shape or a disk shape.

The lamp may further include a shield part, the first lens unit may include a first input surface that is a surface, to which the light is input from the light source unit, and the shield part may be formed on the first input surface and may shield a portion of the light input from the light source unit to form a low beam pattern.

The shield part may be formed by coating the first input surface with a material that shields the light.

The shield part may be formed in a lower area of the first input surface.

The second lens unit may include a lens body including a second input surface that is a surface that faces the first lens unit and a second output surface that is a surface that faces an opposite direction to the second input surface, and the optic may be formed on any one of the second input surface and the second output surface, and may include a curved surface that is convex in an opposite direction to a direction that faces the lens body.

A vertical cross-sectional shape of the optic may have the same shape along a lower end part that is an opposite end thereof in the first direction from an upper end part that is one end thereof in the first direction.

A vertical cross-sectional shape of the optic may be gradually changed along a lower end part that is an opposite end thereof in the first direction from an upper end part that is one end thereof in the first direction.

A radius of curvature of the optic may be formed to become smaller as it goes from the upper end part to the lower end part.

A thickness of the optic may be formed to become larger as it goes from the upper end part to the lower end part.

Widths of the plurality of optics in the second direction may be the same.

Among a surface of the second lens unit, to which the light is input, and a surface thereof, from which the light is output, a surface having no optic may be formed to be flat.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, embodiments of the present disclosure will be described in detail according to the accompanying drawings.

First, embodiments that will be described below are embodiments that are suitable for helping understand technical features of a lamp for a vehicle according to the present disclosure. However, the present disclosure is neither limited to the embodiments that will be described below nor the technical features of the present disclosure is restricted by the described embodiments, and various modifications may be made within a technical range of the present disclosure.

Figure 1:
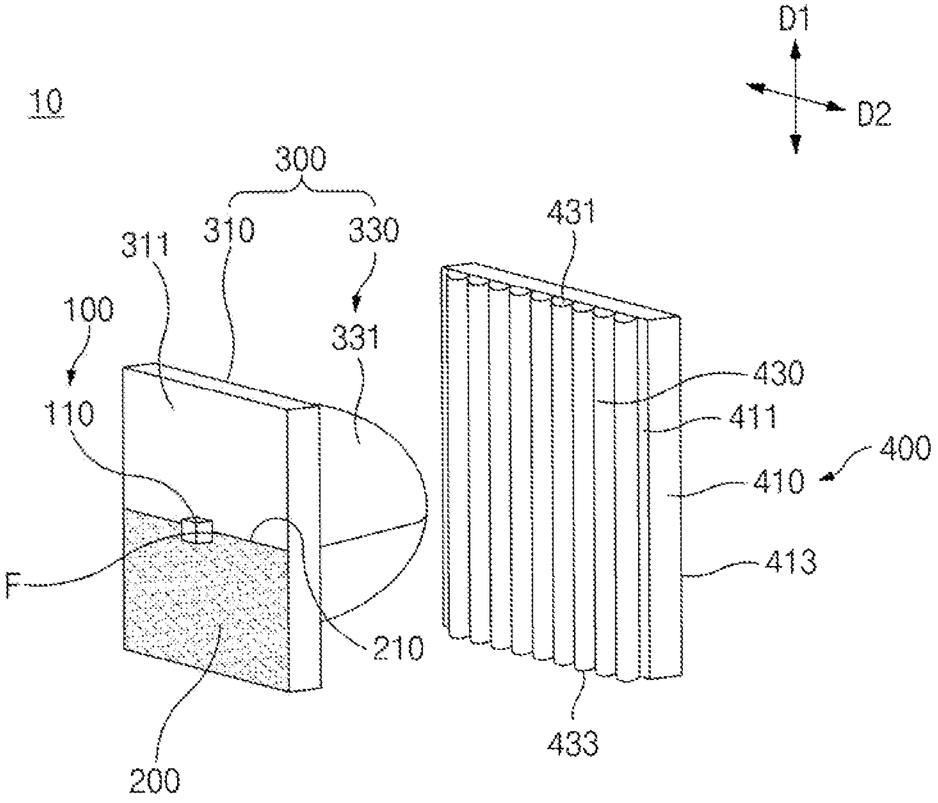
FIG. 1 illustrates a lamp for a vehicle according to a first embodiment of the present disclosure, and is a perspective view viewed from a first lens unit.
Figure 2:
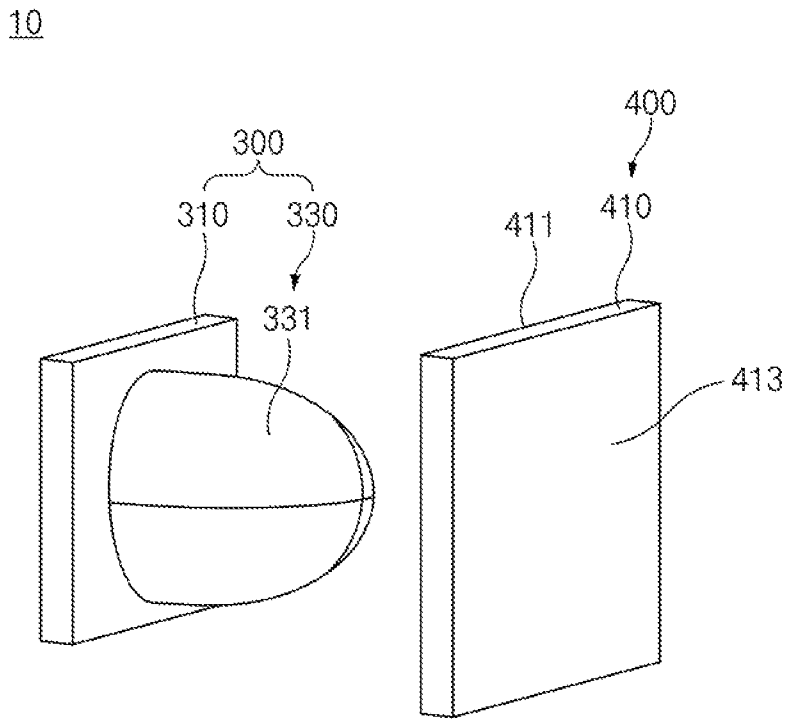
FIG. 2 illustrates a lamp for a vehicle according to a first embodiment of the present disclosure, and is a perspective view viewed from a second lens unit.
Figure 3:
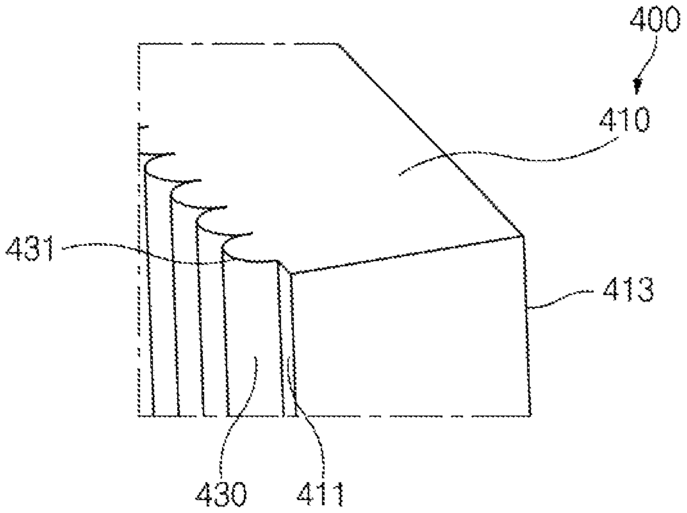
FIG. 3 is an enlarged perspective view illustrating an upper end part of a second lens unit illustrated in FIG. 1.
Figure 4:
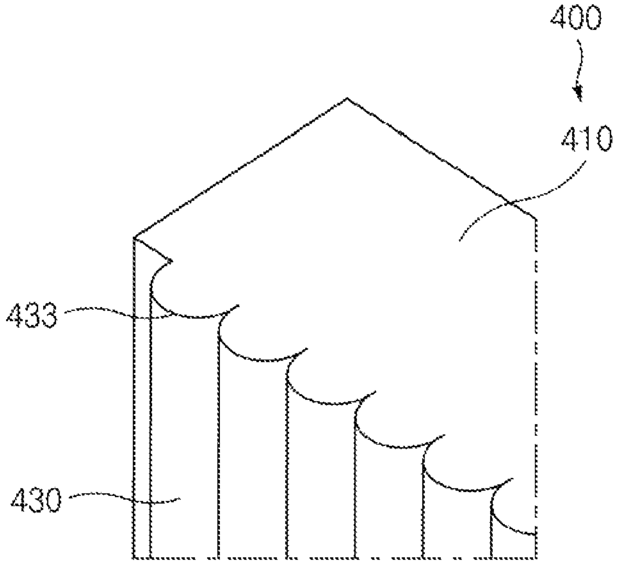
FIG. 4 is an enlarged perspective view illustrating a lower end part of a second lens unit illustrated in FIG. 1.
Figure 5:
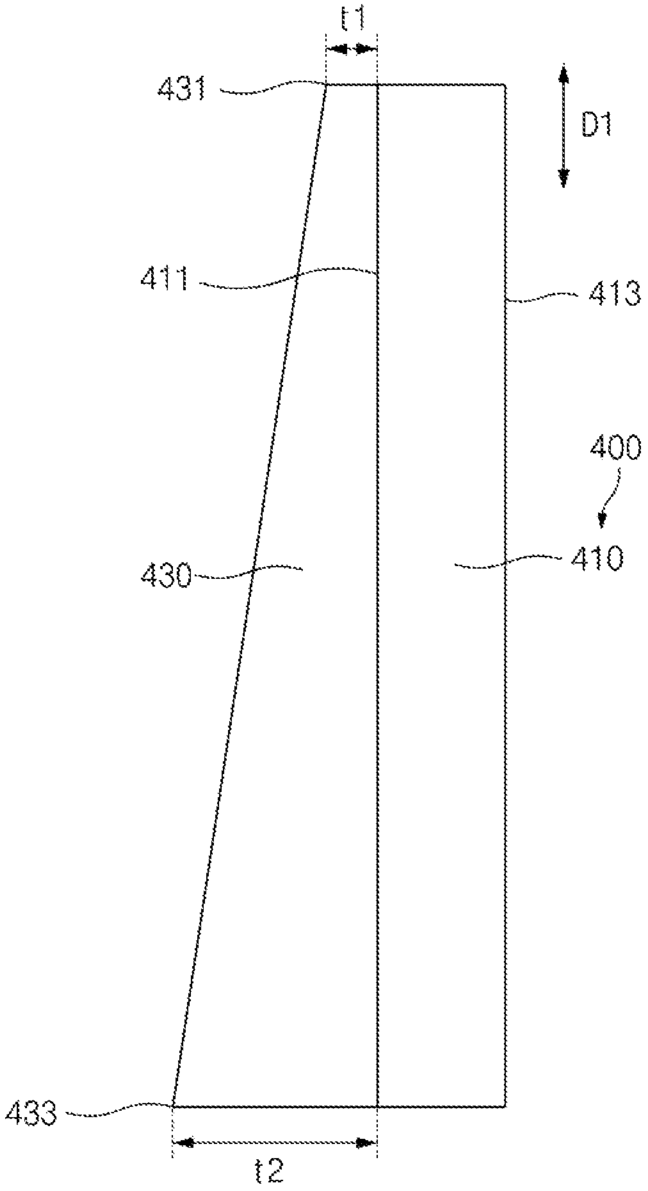
FIG. 5 is a side view illustrating a second lens unit illustrated in FIG. 1, viewed from a lateral side.
Figure 6:
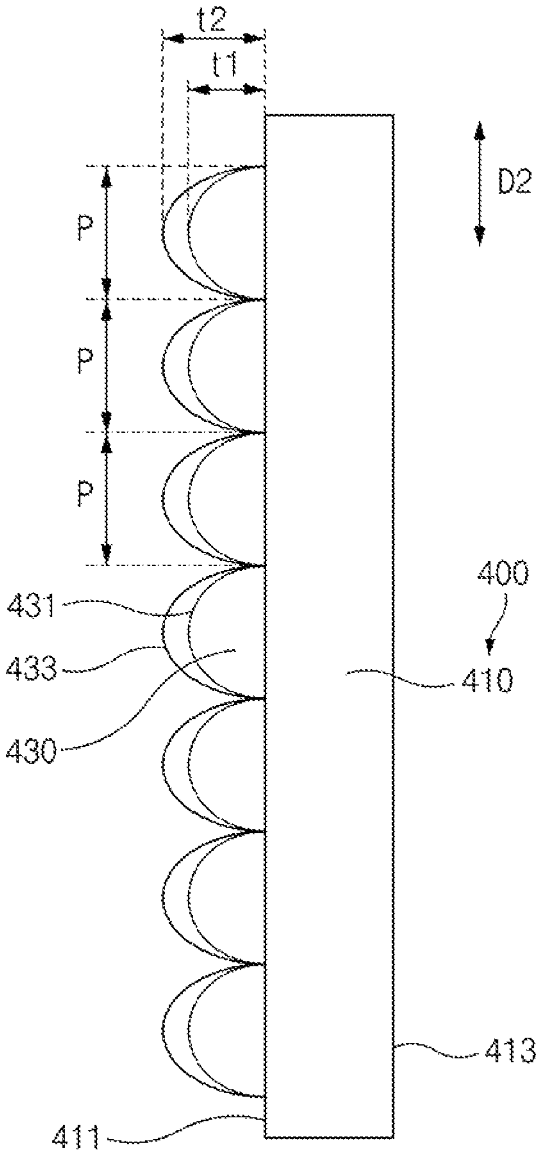
FIG. 6 is a top view illustrating a second lens unit illustrated in FIG. 1, viewed from a top.

FIG. 1 illustrates a lamp for a vehicle according to a first embodiment of the present disclosure, and is a perspective view viewed from a first lens unit. FIG. 2 illustrates the lamp for a vehicle according to a first embodiment of the present disclosure, and is a perspective view viewed from a second lens unit. FIG. 3 is an enlarged perspective view illustrating an upper end part of the second lens unit illustrated in FIG. 1. FIG. 4 is an enlarged perspective view illustrating a lower end part of the second lens unit illustrated in FIG. 1. FIG. 5 is a side view illustrating the second lens unit illustrated in FIG. 1, viewed from a lateral side. FIG. 6 is a top view illustrating the second lens unit illustrated in FIG. 1, viewed from a top.

Referring to FIGS. 1 to 6, a lamp 10 for a vehicle according to a first embodiment of the present disclosure includes a light source unit 100, a first lens unit 300, and a second lens unit 400. Furthermore, the lamp 10 for a vehicle according to the first embodiment of the present disclosure may further include a shield part 200.

The light source unit 100 may be configured to generate and irradiate light. For example, the light source unit 100 may include a light source 110 and a board (not illustrated). For example, the light source 110 may be a light emitting diodes (hereinafter, referred to as an LED), and the board may be a printed circuit board.

The first lens unit 300 may be disposed on a front side of the light source unit 100, and is configured to condense the light output from the light source unit 100 and output the light to a front side. For example, the light generated by the light source 110 may be irradiated radially, and the first lens unit 300 may function to condense the light radiated from the light source 110, convert the light to parallel light, and input the light to the second lens unit 400.

The second lens unit 400 is provided on a front side of the first lens unit 300, and is configured to diffuse and output the light input from the first lens unit 300. More preferably, the second lens unit 400 may diffuse the light input from the first lens unit 300 in a leftward/rightward direction.

Here, the second lens unit 400 includes an optic 430. A plurality of optics 430 are provided on any one of a surface, to which the light is input, and a surface, from which the light is output, are formed to extend in a first direction D1 that is a direction that is perpendicular to a ground surface, and are arranged in a second direction D2 that is a direction that is perpendicular to the first direction D1. Then, the first direction D1 may be an upward/downward direction, and the second direction D2 may be the leftward/rightward direction.

In detail, the second lens unit 400 may include a lens body 410, and the lens body 410 may include a second input surface 411 that is a surface that faces the first lens unit 300, and a second output surface 413 that is a surface that faces an opposite direction to the second input surface 411.

The plurality of optics 430 may be formed on any one of the second input surface 411 and the second output surface 413. That is, the optics 430 may be formed only on the second input surface 411 of the lens body 410 (see FIGS. 1 to 6), or may be formed only on the second output surface 413 of the lens body 410 (see FIG. 7).

In this way, in the second lens unit 400, the optics 430 may be formed on any one of the second input surface 411 and the second output surface 413 provided in the lens body 410 to simplify a structure and a manufacturing process of the second lens unit 400.

In detail, in a conventional micro lens array (MLA), a problem of a complex structure and work process occurs as the optics 430 are formed on opposite surfaces thereof including an input surface and an output surface and a process of precisely aligning the optics 430 on the input surface and the optics 430 on the output surface at corresponding locations is added. According to the present disclosure, because the optics are formed only on one surface of the second lens unit 400, a structure and a manufacturing process of the second lens unit 400 may be simplified. Accordingly, the present disclosure may enhance work performance and reduce costs.

Furthermore, the optics 430 may be formed to extend in the first direction D1 that is an upward/downward direction, and may include a curved surface that is convex in an opposite direction to a direction that faces the lens body 410. For example, when the optics 430 are formed on the second input surface 411, the optics 430 may be formed to be convex in a direction that faces the first lens unit 300. Furthermore, for example, the optics 430 may be formed in most of areas of any one surface of the lens body 410.

The optics 430 included in the second lens unit 400 extend lengthwise in the upward/downward direction and a vertical cross-sectional shape thereof is formed to be convex in an opposite direction to the lens body 410 whereby they function to diffuse and output the light input from the first lens unit 300.

Figure 9:
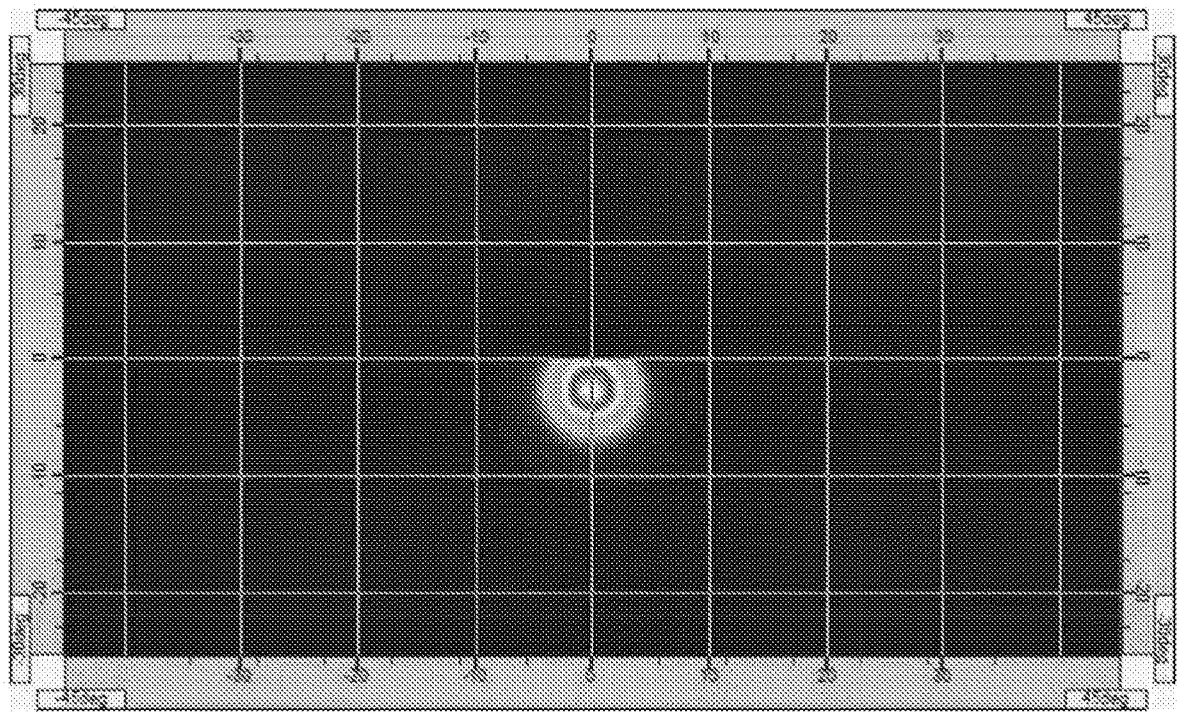
FIG. 9 illustrates a comparative example of the present disclosure, and is a view illustrating an example of a beam pattern by a lamp 10*x* for a vehicle that does not use a second lens unit.
Figure 10:
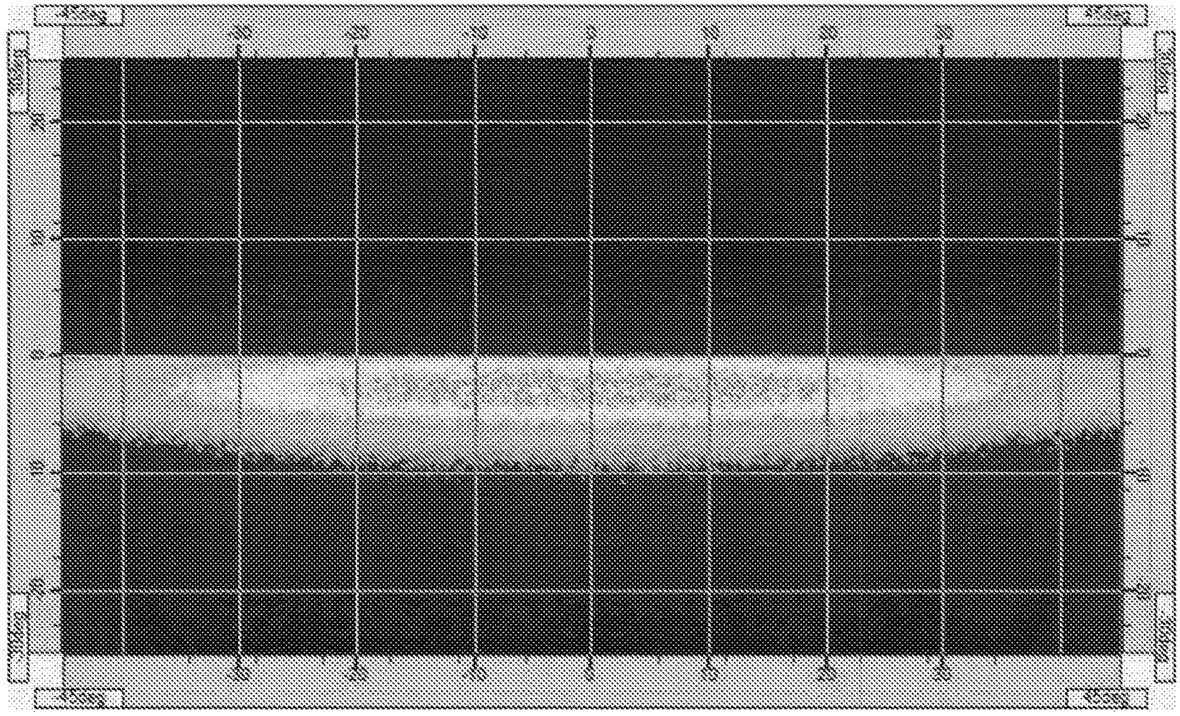
FIG. 10 is a view illustrating an example of a beam pattern by lamps for a vehicle according to first and second embodiments of the present disclosure.

For example, FIG. 9 illustrates a comparative example of the present disclosure, and is a view illustrating an example of a beam pattern by a lamp 10*x* for a vehicle that does not use a second lens unit, and FIG. 10 is a view illustrating an example of a beam pattern by the lamps for a vehicle according to first and second embodiments of the present disclosure. As in the illustrated embodiment, the light that passed through the second lens unit 400, to which the optics 430 according to the present disclosure are applied, may form a diffused optical pattern.

Meanwhile, among a surface of the second lens unit 400, to which the light is input, and a surface thereof, from which the light is output, a surface having no optic 430 may be formed to be flat. That is, when the second lens unit 400 is injection-molded, any one surface of the lens body 410 may be maintained in a flat state while a process of forming the optics 430 on the any one surface is omitted.

Meanwhile, referring to FIGS. 1 to 3, the first lens unit 300 may include an input part 310 and an output part 330. The input part 310 may include a first input surface 311 that is a surface, to which the light is input from the light source unit 100. The output part 330 may include the output part 330 including an first output surface 331 that is a surface, from which the light input to the input part 310 is output.

Furthermore, the output part 330 may be an aspheric lens, in which the first output surface 331 is aspheric. Here, the aspheric shape of the output part 330 may be formed such that a direction of the light radiated from the light source 110 is changed to face the second lens unit 400.

Furthermore, the input part 310 may have a plate shape. For example, the input part 310 may have a four-sided shape (see FIGS. 1 and 2) or a disk shape (see FIGS. 6 and 7). The shape of the input part 310 is not limited thereto, and may be variously modified according to a design specification of the first lens unit 300.

Meanwhile, the shield part 200 may be formed on the first input surface 311 and be configured to shield a portion of the light that is input from the light source unit 100 such that a low beam pattern is formed.

For example, the shield part 200 may be formed in a lower area of the first input surface 311. A portion of the light irradiated from the light source 110 toward the first input surface 311 may be shielded by the shield part 200, and thus the light output through the second lens unit 400 may form the low beam pattern.

For example, the shield part 200 may be formed by coating the first input surface 311 with a material that may shield light. Here, a shield material that implements the shield part 200 is not limited, and known materials that may shield light may be applied without any limitation. For example, the shield part may be coated on the first input surface through a photolithography scheme, but the present disclosure is not limited thereto.

According to the present disclosure, a work process of the lamp 10 for a vehicle may be simplified and a manufacturing performance thereof may be enhanced by coating the shield part 200 on the first input surface 311.

In detail, the shield that shields a portion of the light in the conventional MLA structure is formed in a body part and is disposed between an input lens array and an output lens array, but in this case, a process of forming the shield is complex. According to the present disclosure, because the shield part 200 is formed by coating the shield material on the first input surface 311 of the first lens unit 300, a process of forming the shield part 200 may be simplified.

Furthermore, a focus "F" of the output part 330 may be formed on the first input surface 311. In more detail, the focus "F" of the output part 330 may be formed at an upper end 210 of the shield part 200 on the first input surface 311.

The shield part 200 may form a cutoff line of a low beam pattern by shielding the light. Accordingly, because the focus of the output part 330 is formed at the upper end 210 of the shield part 200, a low beam pattern, having a clear image of the cutoff may be formed.

Meanwhile, although not illustrated, for example, a vertical cross-sectional shape of the optic 430 may be formed to have the same shape along a lower end part 433 that is an opposite end thereof in the first direction D1 from an upper end part 431 that is one end thereof in the first direction D1.

That is, a curvature, a thickness, and a width thereof in the second direction D2 may be formed to be the same along the lower end part 433 from the upper end part 431 of the optic 430. However, the shape of the optic 430 is not limited thereto.

Meanwhile, referring to FIGS. 5 and 6, the optic 430 may be formed such that the shape thereof is gradually changed as it goes from the upper end part 431 that is one end thereof in the first direction D1 to the lower end part 433 that is an opposite end thereof in the first direction D1.

The light that passed through the second lens unit 400 may form a beam pattern diffused by the optic 430. Here, a form of the beam pattern by the light that passed through the second lens unit 400 may be changed according to the curvature, the thickness, and the width in the second direction D2 of the optic 430. Accordingly, the shape of the optic 430 may be determined according to a design specification of the applied lamp 10 for a vehicle.

For example, the optic 430 may be formed such that a radius of curvature thereof becomes smaller as it goes from the upper end part 431 to the lower end part 433. That is, the optic 430 may be formed such that a curvature thereof becomes larger as it goes from the upper end part 431 to the lower end part 433. Reference numeral t1 of FIGS. 5 and 6 denotes a thickness of the upper end part of the optic, and reference numeral t2 denotes a thickness of the lower end part of the optic.

In detail, when the thickness of the optic 430 is similar, an amount of the light input through the optic 430 may become larger as the curvature of the optic 430 becomes larger. Accordingly, in the first embodiment of the present disclosure, because the radius of curvature of the optic 430 becomes larger as it goes to the lower end part 433 of the optic 430, an amount of the light input to a lower area of the second lens unit 400 that is an area having a relatively low intensity of illumination may be increased.

Accordingly, according to the present disclosure, a uniformity of the amount of the light that passes through the second lens unit 400 may be enhanced, and thus, a uniformity of the beam pattern by the light that passes through the second lens unit 400 may be enhanced.

Furthermore, the optic 430 may be formed such that a thickness thereof becomes larger as it goes from the upper end part 431 to the lower end part 433.

As the thickness of the optic 430 becomes larger, the amount of the light input through the optic 430 may be increased. Accordingly, in the first embodiment of the present disclosure, because the thickness of the optic 430 becomes larger as it goes to the lower end part 433 of the optic 430, an amount of the light input to a lower area of the second lens unit 400 that is an area having a relatively low intensity of illumination may be increased.

Accordingly, according to the present disclosure, a uniformity of the amount of the light that passes through the second lens unit 400 may be enhanced, and thus, a uniformity of the beam pattern by the light that passes through the second lens unit 400 may be enhanced.

Here, widths of the plurality of optics 430 in the second direction D2 may be formed to be the same. That is, the shapes of the upper end part 431 and the lower end part 433 of the optic 430 may be formed such that at least one of the thickness and the curvature thereof is different while a width "P" thereof in the second direction D2 is constant.

However, the shape of the optic 430 is not limited to the illustrated embodiment, and may be modified into different shapes.

Figure 7:
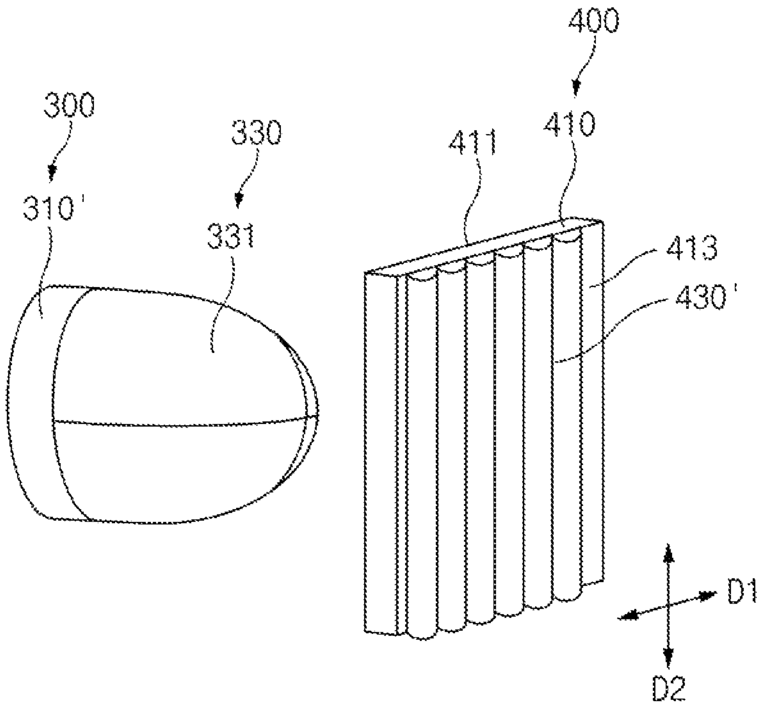
FIG. 7 illustrates a lamp for a vehicle according to a second embodiment of the present disclosure, and is a perspective view viewed from a second lens unit.
Figure 8:
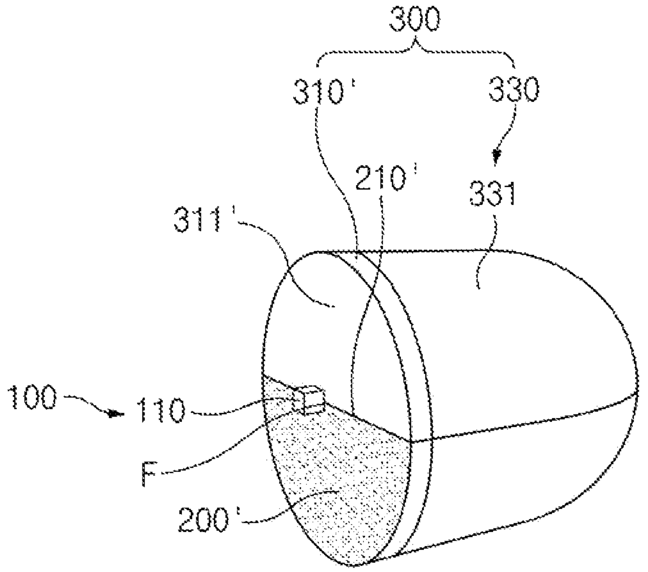
FIG. 8 illustrates a lamp for a vehicle according to a second embodiment of the present disclosure, and is a perspective view illustrating a first lens unit and a light source unit.

Meanwhile, FIGS. 7 and 8 illustrate the lamp 10 for a vehicle according to a second embodiment of the present disclosure. FIG. 7 illustrates a lamp for a vehicle according to a second embodiment of the present disclosure, and is a perspective view viewed from a second lens unit. FIG. 8 illustrates the lamp for a vehicle according to a second embodiment of the present disclosure, and is a perspective view illustrating a first lens unit and a light source unit.

The lamp 10 for a vehicle according to the second embodiment of the present disclosure is different from the above-described first embodiment of the present disclosure in locations of an input part 310' of the first lens unit 300 and an optic 430' of the second lens unit 400. The lamp 10 for a vehicle according to the second embodiment of the present disclosure may include all of the configurations of the first embodiment, except for the difference. Hereinafter, a detailed description of the same configurations as the above configurations will be omitted.

According to the second embodiment of the present disclosure, the input part 310' of the first lens unit 300 may have a disk shape. Then, the input part 310' may be formed to correspond to a front shape of the output part 330. However, the shape of the input part 310' according to the present disclosure is not limited thereto.

A shield part 200' may be formed on a first input surface 311' of the input part 310', and a focus of the output part 330 may be located at an upper end 210' of the shield part 200'.

Meanwhile, according to the second embodiment of the present disclosure, the optic 430' may be formed on the second output surface 413 of the lens body 410. However, the location of the optic 430 is not limited thereto, and may be formed on the second input surface 411.

According to the embodiment of the present disclosure, the optic may be formed only on one surface of the second lens unit and the shape of the optic may be simplified whereby a structure and a manufacturing process of the lamp for a vehicle may be simplified. Accordingly, the present disclosure may enhance work performance and reduce costs.

Although the present disclosure has been described above with reference to the limited embodiments and drawings, the present disclosure is not limited thereto, and it is apparent that various embodiments may be made within the technical spirits of the present disclosure and an equivalent range of the claims, which will be described below.

What is claimed is:

1. A lamp for a vehicle, comprising:

a light source unit configured to output light;

a first lens unit disposed on a front side of the light source unit through which light from the light source unit passes, the first lens unit being configured to condense the light from the light source unit and output the light through a front side of the first lens unit; and a second lens unit disposed on the front side of the first lens unit configured to diffuse and output the light, wherein the second lens unit includes:

a plurality of optics through which the light passes, each of the optics extending from a top to a bottom of the second lens unit in a first direction perpendicular to a ground surface and the plurality of optics being arranged along a second direction perpendicular to the first direction, a lens body including a second input surface that faces the first lens unit and a second output surface that faces away from the second input surface, and the plurality of optics is disposed on the second input surface and the second output surface is flat, and wherein the first lens unit includes:

an input part including a first input surface that is a surface through which the light is received from the light source unit; and an output part including a first output surface through which the light input to the input part is output, and the first output surface is configured such that the output part forms an aspheric lens, the aspherical lens having a non-planar surface that is non-spherical, and wherein a vertical cross-sectional shape of the plurality of optics gradually changes from the lower end part to the upper end part.

2. The lamp of claim 1, wherein the aspheric lens is focused on the first input surface.

3. The lamp of claim 1, wherein the input part has a four-sided plate shape or a disk shape.

4. The lamp of claim 1, further comprising:

a shield part disposed on the first input surface, wherein the shield part is configured to shield a portion of the light to form a low beam pattern.

5. The lamp of claim 4, wherein the shield part is coated at the first input surface with a material that shields the light.

6. The lamp of claim 4, wherein the shield part is formed in a lower area of the first input surface.

7. The lamp of claim 1, wherein a radius of curvature of the plurality of optics decreases from the upper end part to the lower end part.

8. The lamp of claim 1, wherein a thickness of the plurality of optics increases from the upper end part to the lower end part.

9. The lamp of claim 1, wherein widths of the plurality of optics in the second direction are mutually constant.

* * * * *